(12) United States Patent
Patro (10) Patent No.: US 10,389,541 B1
(45) Date of Patent: Aug. 20, 2019

(54) SYSTEM, METHOD, AND COMPUTER PROGRAM FOR IMPLEMENTING RATING, CHARGING AND POLICY CONTROL OF MULTIPATH COMMUNICATION SERVICES

(71) Applicant: Amdocs Development Limited, Limassol (CY)

(72) Inventor: Debabrata Patro, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 15/788,552

(22) Filed: Oct. 19, 2017

(51) Int. Cl.
| | | |
|---|---|---|
| H04L 12/14 | (2006.01) | |
| H04L 29/06 | (2006.01) | |
| H04L 12/813 | (2013.01) | |
| H04L 12/707 | (2013.01) | |

(52) U.S. Cl.
CPC .......... H04L 12/1407 (2013.01); H04L 45/24 (2013.01); H04L 47/20 (2013.01); H04L 63/04 (2013.01)

(58) Field of Classification Search
CPC ..... H04L 12/1407; H04L 63/04; H04L 47/20; H04L 45/24
See application file for complete search history.

(56) References Cited

U.S. PATENT DOCUMENTS

| | | | |
|---|---|---|---|
| 10,075,987 B2 * | 9/2018 | Teyeb | H04L 69/14 |
| 2012/0331160 A1 * | 12/2012 | Tremblay | H04L 69/14 709/228 |
| 2014/0078899 A1 * | 3/2014 | Zhou | H04L 41/0893 370/230 |
| 2014/0351447 A1 * | 11/2014 | Annamalaisami | H04L 65/1069 709/227 |

(Continued)

FOREIGN PATENT DOCUMENTS

| | | |
|---|---|---|
| WO | 2016066210 A1 | 5/2016 |
| WO | 2016144224 A1 | 9/2016 |

OTHER PUBLICATIONS

Ford et al., "TCP Extensions for Multipath Operation with Multiple Addresses," Internet Engineering Task Force, Jan. 2013, pp. 1-65, retreived from https://tools.ietf.org/html/rfc6824.

(Continued)

*Primary Examiner* — Brian D Nguyen
(74) *Attorney, Agent, or Firm* — Zilka-Kotab, P.C.

(57) ABSTRACT

A system, method, and computer program product are provided for implementing rating, charging and policy control of multipath communication services. In operation, a system receives a first communication from at least one first network element associated with at least one communication network. The system receives a second communication from at least one second network element associated with the at least one communication network. The system identifies (Continued)

information in the at least one first communication and/or the at least one second communication associated with a plurality of sub-flows being utilized in association with the communication. The system correlates the information in the at least one first communication and the at least one second communication associated with the plurality of sub-flows. Moreover, the system implements rating, charging, and policy control for a single connection instead of treating each sub-flow as an independent connection.

11 Claims, 5 Drawing Sheets

(56) References Cited

U.S. PATENT DOCUMENTS

| | | | | |
|---|---|---|---|---|
| 2016/0112239 | A1* | 4/2016 | Kanugovi | H04W 88/16 |
| | | | | 370/338 |
| 2016/0309534 | A1* | 10/2016 | Teyeb | H04L 69/14 |
| 2016/0381019 | A1* | 12/2016 | Modi | H04L 63/0892 |
| | | | | 726/4 |
| 2017/0048074 | A1 | 2/2017 | Roeland | |
| 2017/0078206 | A1 | 3/2017 | Huang et al. | |
| 2017/0134971 | A1 | 5/2017 | Huang et al. | |
| 2017/0317920 | A1* | 11/2017 | Rocquelay | H04L 45/24 |
| 2018/0109473 | A1* | 4/2018 | Boucadair | H04L 45/24 |
| 2018/0146015 | A1* | 5/2018 | Annamalaisami | |
| | | | | H04L 65/1069 |

OTHER PUBLICATIONS

Wikipedia, "Multipath TCP," Jul. 13, 2017, pp. 1-7, as retrieved by the Internet Archive Wayback Machine, https://web.archive.org/web/20170713013030/https://en.wikipedia.org/wiki/Multipath_TCP.

Paasch et al., "Multipath TCP: Decoupled from IP, TCP is at last able to support multihomed hosts," ACM Queue, pp. 1-12.

* cited by examiner

SYSTEM, METHOD, AND COMPUTER PROGRAM FOR IMPLEMENTING RATING, CHARGING AND POLICY CONTROL OF MULTIPATH COMMUNICATION SERVICES

FIELD OF THE INVENTION

The present invention relates to multipath communication, and more particularly to a system for implementing rating, charging and policy control of multipath communication services.

BACKGROUND

Multipath TCP (MPTCP) is an emerging standard being led by Internet Engineering Task Force's (IETF) Multipath TCP working group that aims at having a single logical TCP connection to use multiple paths to maximize bandwidth and increase redundancy of the connection.

In MPTCP there are multiple sub-flows (network level connections) that are grouped to appear as a single connection to the user. The current techniques for performing rating, charging and policy control, which works at the level of physical connection, is not able to handle the MPTCP connections in any meaningful and consistent manner.

MPTCP is one of the standards that support "multihoming" which is the practice of connecting a host or a computer network to more than one network and creating one logical connection using the underlying multiple physical network connections. Some of the other standards and emerging standards in this area besides MPTCP are SCTP (Stream Control Transmission Protocol) and SHIM (Site Multihoming by IPv6 Intermediation). The current techniques for performing rating, charging and policy control, which works at the level of physical connection, are not able to handle the multihoming connections in any meaningful and consistent manner.

There is thus a need for addressing these and/or other issues associated with the prior art.

SUMMARY

A system, method, and computer program product are provided for implementing rating, charging and policy control of multipath communication services. In operation, a system receives a first communication from at least one first network element associated with at least one communication network. The system receives a second communication from at least one second network element associated with the at least one communication network. The system identifies information in the at least one first communication and/or the at least one second communication associated with a plurality of sub-flows being utilized in association with the communication. The system correlates the information in the at least one first communication and the at least one second communication associated with the plurality of sub-flows. Moreover, the system implements rating, charging, and policy control for a single connection instead of treating each sub-flow as an independent connection.

DETAILED DESCRIPTION

Figure 1:
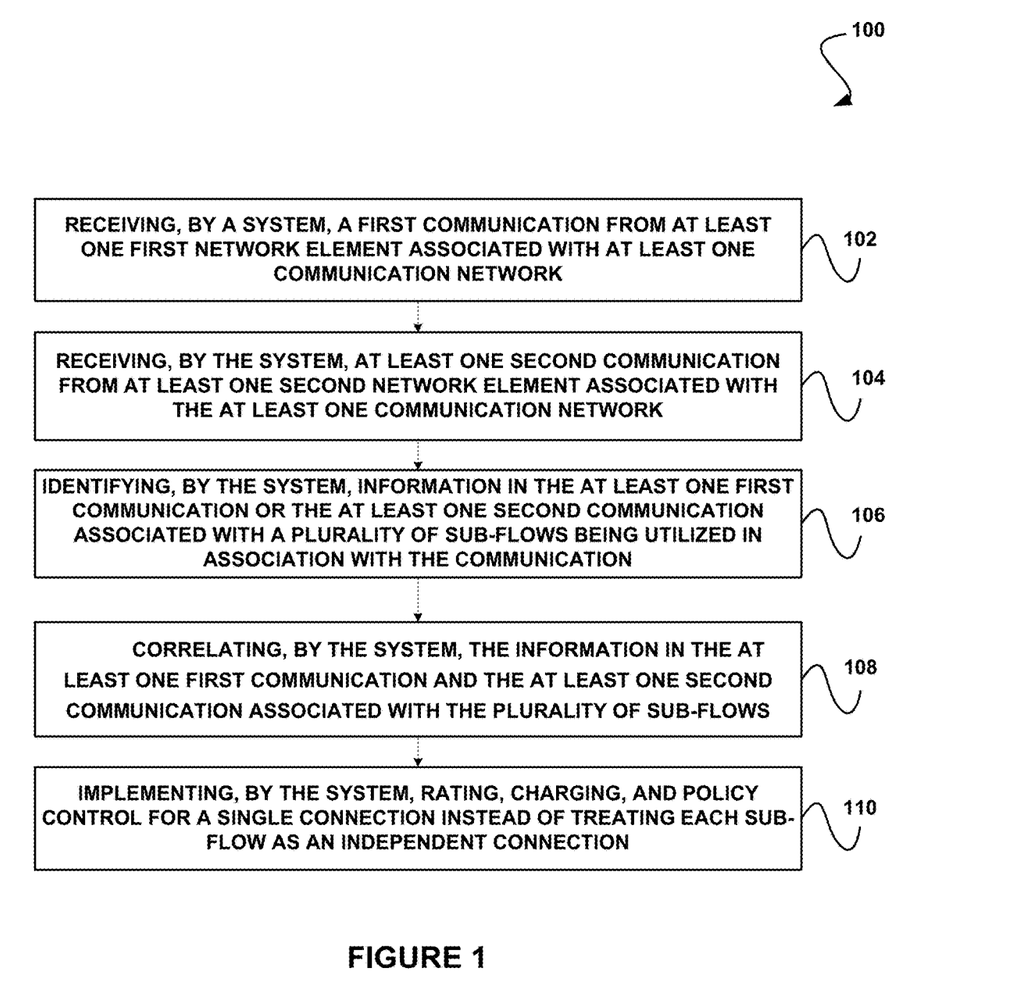
FIG. 1 illustrates a method for implementing rating, charging and policy control of multipath communication services, in accordance with one embodiment.

FIG. 1 illustrates a method 100 for implementing rating, charging and policy control of multipath communication services, in accordance with one embodiment.

In operation, a system receives a first communication from at least one first network element associated with at least one communication network. See operation 102. The system receives a second communication from at least one second network element associated with the at least one communication network. See operation 104. The communications may include any type of communication and/or message, such as a Transmission Control Protocol (TCP) communication. The first and second network elements may be the same network element or a different network element.

The system may include any system capable of receiving the communication. For example, the system may include any system associated with a communication service provider. In this case, in one embodiment, the system may include a system for implementing policy and charging rules. In another embodiment, the system may include a turbo charging system. The communication network may include any type of communication network, such as a cellular network (e.g. 3G, LTE, etc.), a WiFi network, and/or any other type of network.

The system identifies information in the first and/or second communication associated with a plurality of sub-flows being utilized in association with the communication. See operation 106. In one embodiment, the information in the first and second communications associated with the plurality of sub-flows may be encoded as additional attribute value pairs (AVP). In various other embodiments, the information may be embedded in the communications in any manner that allows the system to identify and/or read the information. The information may include any information associated with the sub-flows, such as the number of connections, the type of connections, detail associated with the sub-flows, and/or various other information.

The plurality of sub-flows may be associated with a variety of channels/connections. For example, in one embodiment, the plurality of sub-flows may be associated with Multipath TCP (MPTCP), SCTP (Stream Control Transmission Protocol), and/or SHIM (Site Multihoming) connections. Of course, the plurality of sub-flows may be associated with any multihoming connection.

The system correlates the information in the first and second communication associated with the plurality of sub-flows. See operation 108. In this case, the system identifies the sub-flows as being associated with the same device (e.g. end user device, etc.) and correlates the information.

Moreover, the system implements rating, charging, and policy control for a single connection instead of treating each sub-flow as an independent connection. See operation 110.

In one embodiment, the information in the first and/or second communications may also be utilized by the system to implement security polices by allowing sensitive data transmission only when an active-active MPTCP connection is available.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
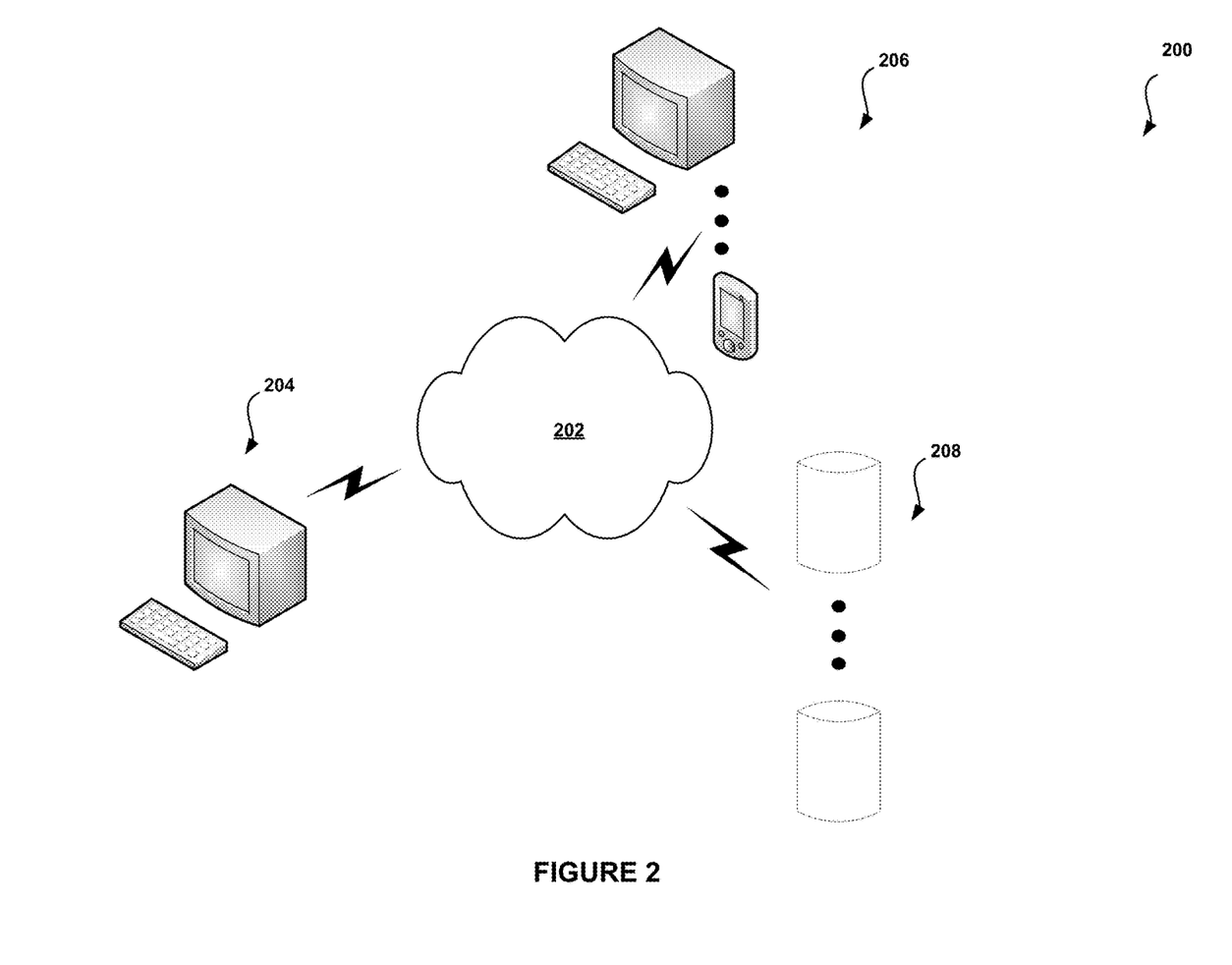
FIG. 2 shows a system for implementing rating, charging and policy control of multipath communication services, in accordance with one embodiment.

FIG. 2 shows a system 200 for implementing rating, charging and policy control of multipath communication services, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems/devices 206, either directly or over one or more networks 202, for implementing rating, charging and policy control. The system 204 may also be in communication with one or more repositories/databases 208. In operation, the systems/devices 206 may individually utilize multiple connections simultaneously to receive data, such as with Multipath TCP (MPTCP).

MPTCP is an emerging standard being led by Internet Engineering Task Force's Multipath TCP working group that aims at having a single logical TCP connection to use multiple paths to maximize bandwidth and increase redundancy of the connection.

In MPTCP there are multiple sub-flows (network level connections) that are grouped to appear as a single connection to the user. The current techniques for performing rating, charging and policy control, which works at the level of physical connection, is not able to handle the MPTCP connections in any meaningful and consistent manner.

The system 204 makes the rating, charging and policy control functions MPTCP aware and handles MPTCP connections in a seamless, consistent way, and in the process enables additional innovative services available to the users.

Most devices such as computers, smartphones, and most communication equipment are now equipped with multiple network interface options such as Wi-Fi and 3G/4G interfaces enabling multiple wireless connections and multiple network interface connections (NICs) enabling multiple wired connections. However, such devices typically use only one interface at a time.

MPTCP aims to address this severe under-utilization of available capabilities and enable multiple network interfaces to be used simultaneously either for increasing available bandwidth beyond what can be supported by any interface individually or as a way of increasing availability/redundancy. For example, a mobile user would have a legitimate expectation that their TCP connections will survive when their smartphone switches from one wireless network to another and that their downloads, etc., will not have to be started from the beginning because the connection dropped in between networks. With regular TCP, switching networks implies changing the local IP address and leads to a termination of all established TCP connections. With MPTCP, the situation could change because it enables seamless handovers from one network to another, such as Wi-Fi to 3G/4G and vice versa. One practical example is the Ski application that uses Multipath TCP on iPhones, iPads and Macs to seamlessly handover from one wireless network to another.

The current state of art is to handle each physical/network connection as a separate and independent entity. For example, if Siri is connected using a 3G and WiFi connection, there is no guarantee that each of those two network connections will have the same quality of service (QOS). Another example could be a possible scenario of Netflix supporting MPTCP and a T-Mobile US user with a Binge On service trying to watch a video while connected to Netflix through two sub-flows (one through 4G and other through WiFi). As per a Binge On policy, the operator can try to forcefully limit the video resolution to be below a threshold on the 3G/4G connection whereas the second sub-flow that is through WiFi will not be getting any such treatment, leading to unpredictable behavior. Similarly, since the charging and call authorization, etc., occur at the sub-flow (physical connection) level, there is no awareness in the relevant systems (e.g. such as Amdocs Turbo Charging, etc.) that they are actually part of the same logical sessions and need to be handled as such.

The system 204 obtains information about the MPTCP being used in the connections at the sub-flow level and correlates and aggregates the different sub-flows at a Turbo Charging (TC)/Policy and Charging Rules Function (PCRF) level to handle the logical TCP connection as the entry at which level the rating, charging and policy control will be done.

This may include enhancing the Diameter (or other protocols) to include additional attribute value pairs for the network elements to send information about the MPTCP enabled connection and identifiers to correlate multiple sub-flows. The system 204 (or a turbo charging system) may use this information to correlate and aggregate information and provide a consistent response back to the network rather than treating each sub-flow as independent entities. This also allows the ability for the operators to define offers that are MPTCP aware.

For example, the operator can define a "Ski Pack" that will give unlimited or perhaps 2 GB of data for Siri connections only that use MPTCP, irrespective of whether it used 3G/4G, xDSL, WiFi, or FTTH connections to communicate and ensure that all Ski connections will get the highest possible QOS or coordinated QOS across the multiple sub-flows. This "Siri Bucket" is different from a traditional allowance bucket in the sense that it is not open for consumption by different independent connections but can be used only if MPTCP is used. This capability of the system 204 (or a turbo charging system) being aware of MPTCP aware will give the communication provider additional rating and charging flexibility (e.g. to charge as one single event irrespective of whether one or multiple network connections are used, or implement charging that is MPTCP aware such as charge higher/lower of MPTCP enabled connections in case single event charging is not desired in some scenarios, etc.).

Similarly, the system 204 (or a PCRF system) may be enhanced to be MPTCP aware and make policy control decisions accordingly. For example, it will be possible for the system 204 to block usage of non-operator provided network for using operator provided services. Since the system 204 (or a turbo charging system) is able to correlate between MPTCP connections, the system 204 (or a turbo charging system) can provide counters that are at the logical connection level and the system 204 (or a PCRF system) in-turn can make policy enforcement decisions based on these new counters. For example, irrespective of the fair usage policy (FUP) status of individual physical connections, the operator can decide to allow Ski connections at the highest possible QOS as long as the "Siri FUP" is not breached. In this case, all connections other than Siri would be throttled but Siri connections will be allowed until a specific Siri FUP is breached.

In one embodiment, the system 204 may be utilized such that communication service provider Digital Channel (e.g. Amdocs UXF/Omni channel, Mobile Applications, etc.) applications are MPTCP aware and allow sensitive data transmission only when an active-active MPTCP connection is available (e.g. itemized bill/call details can be downloaded only if at least two physical connections are there so that even if any hacker is able to wiretap or breach the network connection, they will not be able to reconstruct the whole data). There are many additional use cases that will be enabled when the BSS and OSS applications are MPTCP aware.

Figure 3:
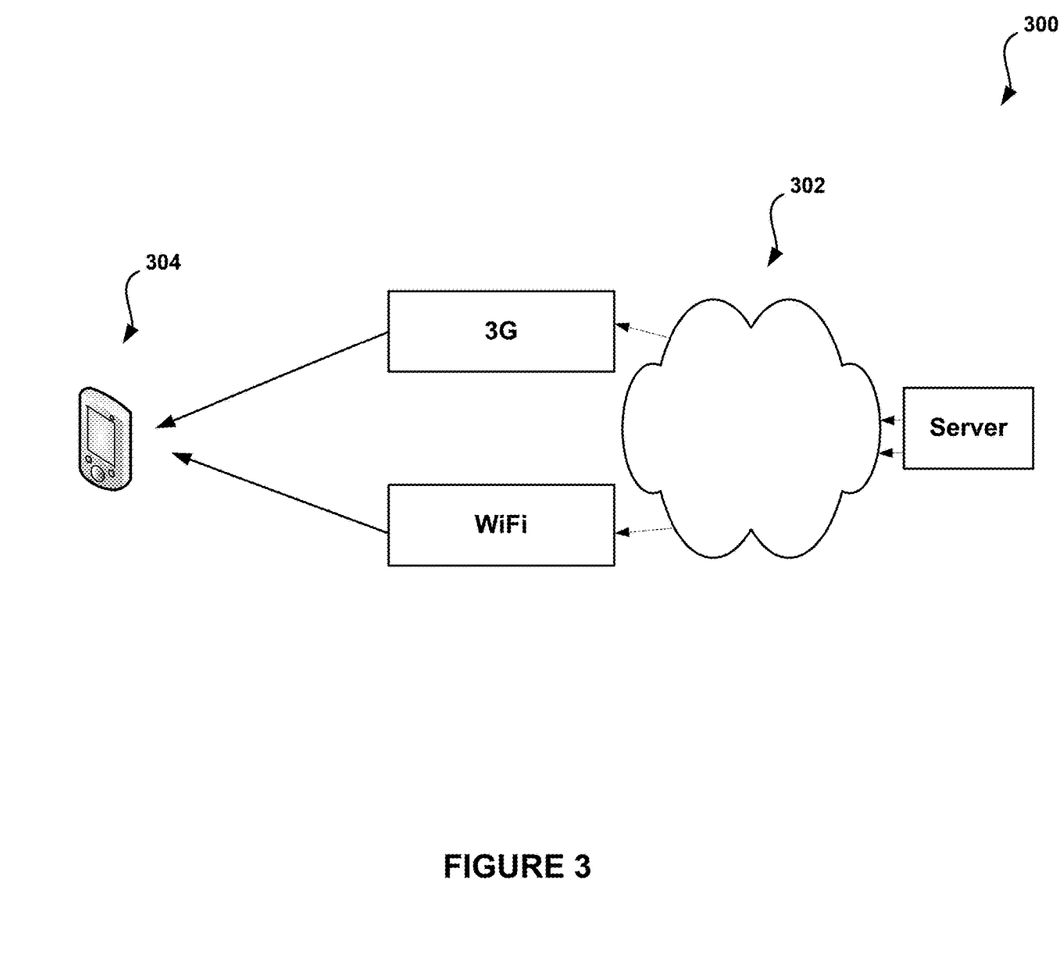
FIG. 3 shows a system flow diagram for implementing rating, charging and policy control of multipath communication services, in accordance with one embodiment.

FIG. 3 shows a system flow diagram 300 for implementing rating, charging and policy control of multipath communication services, in accordance with one embodiment. As an option, the diagram 300 may be implemented in the context of the details of the previous figure and/or any subsequent figure(s). Of course, however, the diagram 300 may be implemented in the context of any desired environment. Further, the aforementioned definitions may equally apply to the description below.

As shown, a device 304 (e.g. a mobile phone, a tablet computer, etc.) receives communications from multiple channels (e.g. 3G and WiFi, etc.) over one or more networks 302. In operation, a communication service provider system that is MPTCP aware because of receiving information about the multipath communication, correlates information associated with the multiple paths and implements rating, charging, and policy control for a single connection instead of treating each sub-flow as an independent connection.

Figure 4:
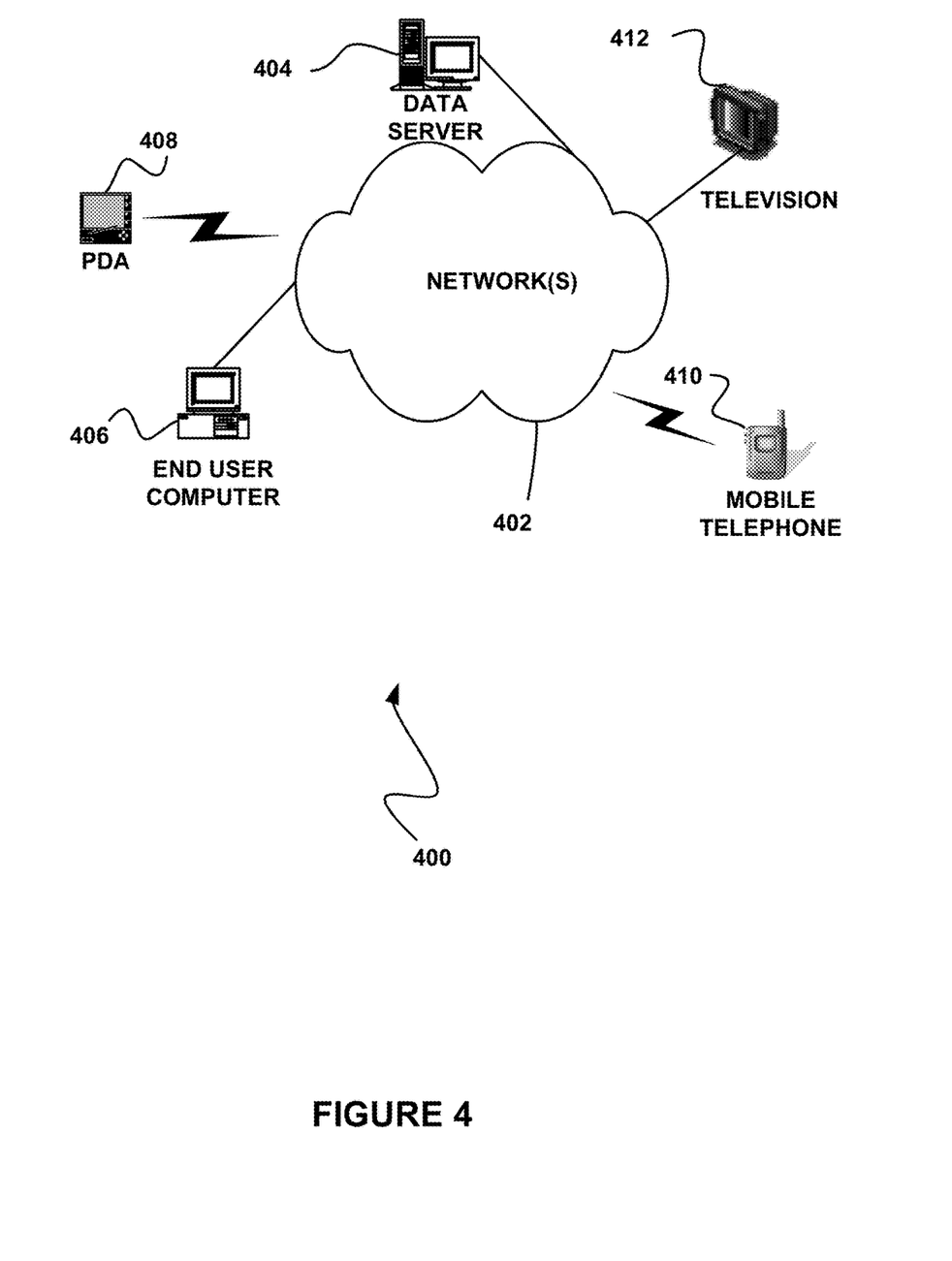
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
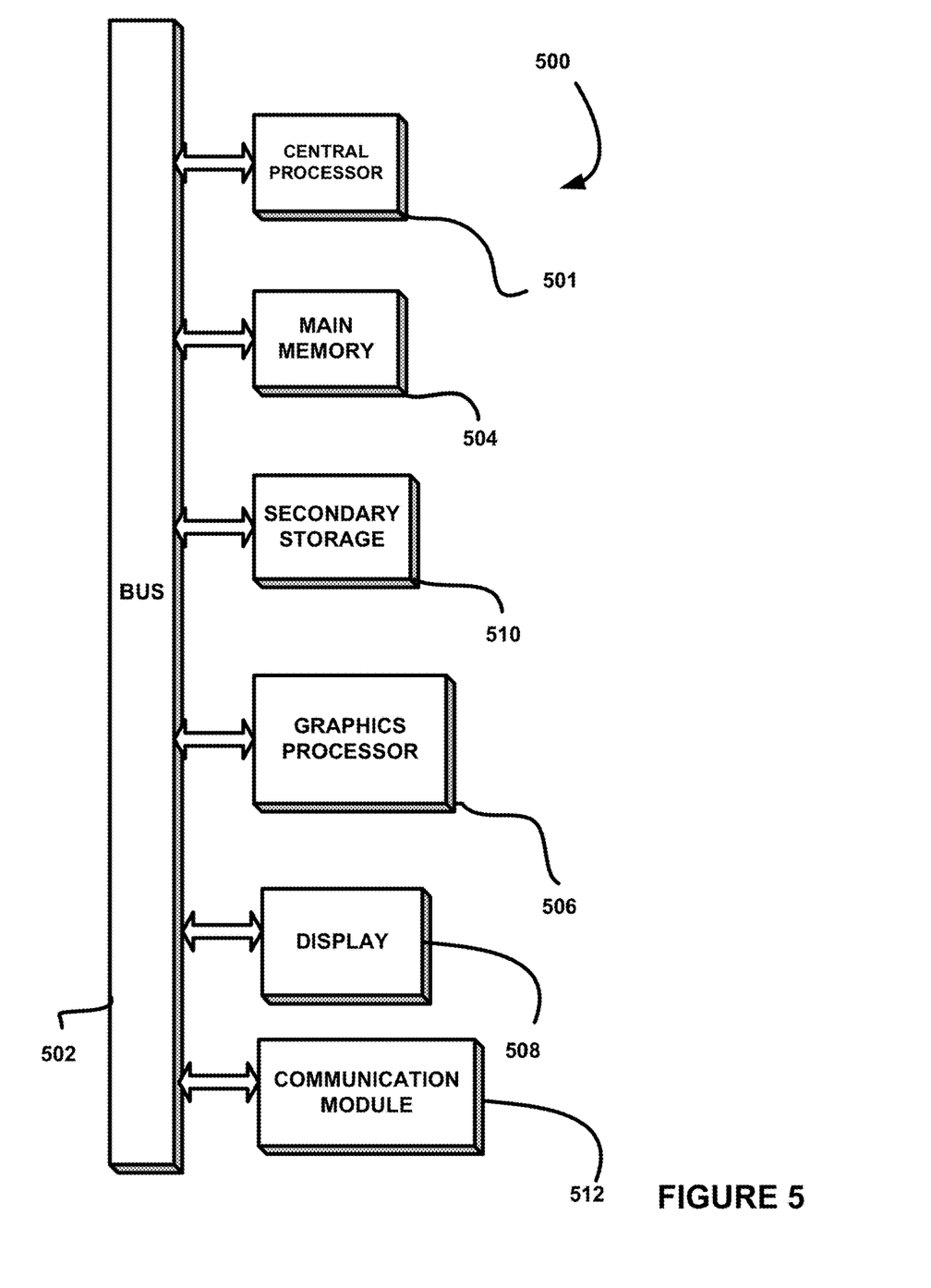
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 505 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    receiving, by a system, an indication of a plurality of communications received by a user device via a plurality of different physical network connections;
    determining, by the system, that the plurality of communications are associated with a same Multipath Transmission Control Protocol (MPTCP) logical connection, based on information embedded in the plurality of communications;
    implementing, by the system, rating, charging, and policy control for the logical connection.

2. The method of claim 1, wherein the information embedded in the plurality of communications includes a number of the different physical network connections, types of the different physical network connections.

3. The method of claim 1, wherein the plurality of communications are received by the user device via simultaneous use of the plurality of different physical network connections.

4. The method of claim 1, wherein the MPTCP logical connection is utilized to maximize bandwidth and increase redundancy of the logical connection.

5. The method of claim 1, wherein the MPTCP logical connection groups the plurality of different physical network connections to appear as a single connection to a user of the user device.

6. The method of claim 1, wherein the plurality of communications include attribute value pairs providing information about the MPTCP logical connection, and wherein the attribute value pairs are utilized for determining that the plurality of communications are associated with the same MPTCP logical connection.

7. The method of claim 1, wherein the policy control includes making policy enforcement decisions based on a number of MPTCP logical connections associated with the user device.

8. The method of claim 1, wherein the policy control includes allowing sensitive data transmission only when the MPTCP logical connection is available.

9. The method of claim 1, wherein the system implements the rating, charging, and policy control for the logical connection instead of independently for each of the different physical connections.

10. A computer program product embodied on a non-transitory computer readable medium, comprising computer code for:

receiving, by a system, an indication of a plurality of communications received by a user device via a plurality of different physical network connections;

determining, by the system, that the plurality of communications are associated with a same Multipath Transmission Control Protocol (MPTCP) logical connection, based on information embedded in the plurality of communications;

implementing, by the system, rating, charging, and policy control for the logical connection.

11. A system, comprising one or more processors, operable for:

receiving, by the system, an indication of a plurality of communications received by a user device via a plurality of different physical network connections;

determining, by the system, that the plurality of communications are associated with a same Multipath Transmission Control Protocol (MPTCP) logical connection, based on information embedded in the plurality of communications;

implementing, by the system, rating, charging, and policy control for the logical connection.

* * * * *